United States Patent [19]

Nakatani et al.

[11] 4,369,334
[45] Jan. 18, 1983

[54] AUDIBLE ANNOUNCEMENT IN AN ELECTRONIC CASH REGISTER

[75] Inventors: Hiroshi Nakatani; Masahide Ishida, both of Yamatokoriyama; Hachizou Yamamoto, Nara, all of Japan

[73] Assignee: Sharp Kabushiki Kaisha, Osaka, Japan

[21] Appl. No.: 130,346

[22] Filed: Mar. 14, 1980

[30] Foreign Application Priority Data

Mar. 16, 1979 [JP] Japan .................................. 54-32142
Mar. 16, 1979 [JP] Japan .................................. 54-32143
Mar. 16, 1979 [JP] Japan .................................. 54-32144
Mar. 16, 1979 [JP] Japan .................................. 54-32145

[51] Int. Cl.³ .............................................. G10L 1/00
[52] U.S. Cl. ............................. 179/1 SM; 235/92 AC
[58] Field of Search ............ 179/1 SM; 364/405, 404, 364/513, 710; 340/148; 235/92 AC

[56] References Cited

U.S. PATENT DOCUMENTS 3,313,923 4/1967 Felcheck ........................ 235/92 AC
3,588,838 6/1971 Felcheck ............................. 364/900
3,806,711 4/1974 Cousins ......................... 235/92 AC
4,060,848 11/1977 Hyatt ..................................... 364/200
4,185,169 1/1980 Tanimoto et al. ................ 179/1 SM Primary Examiner—Emanuel S. Kemeny
Attorney, Agent, or Firm—Birch, Stewart, Kolasch & Birch

[57] ABSTRACT

An electronic cash register includes a synthetic speech sound generation system for providing an audible announcement of the total amount of the transaction when the transaction assigned to a specific customer is completed. When a clerk introduces money information concerning the amount handed from the customer, the audible announcement is generated from the synthetic speech sound generation system for announcing the money received from the customer. The electronic cash register calculates the change which should be handed to the customer, and the change is also audibly announced. Moreover, the synthetic speech sound generation system provides an audible announcement of "Thank you for your patronage." when the transaction for the specific customer is completed.

5 Claims, 2 Drawing Figures

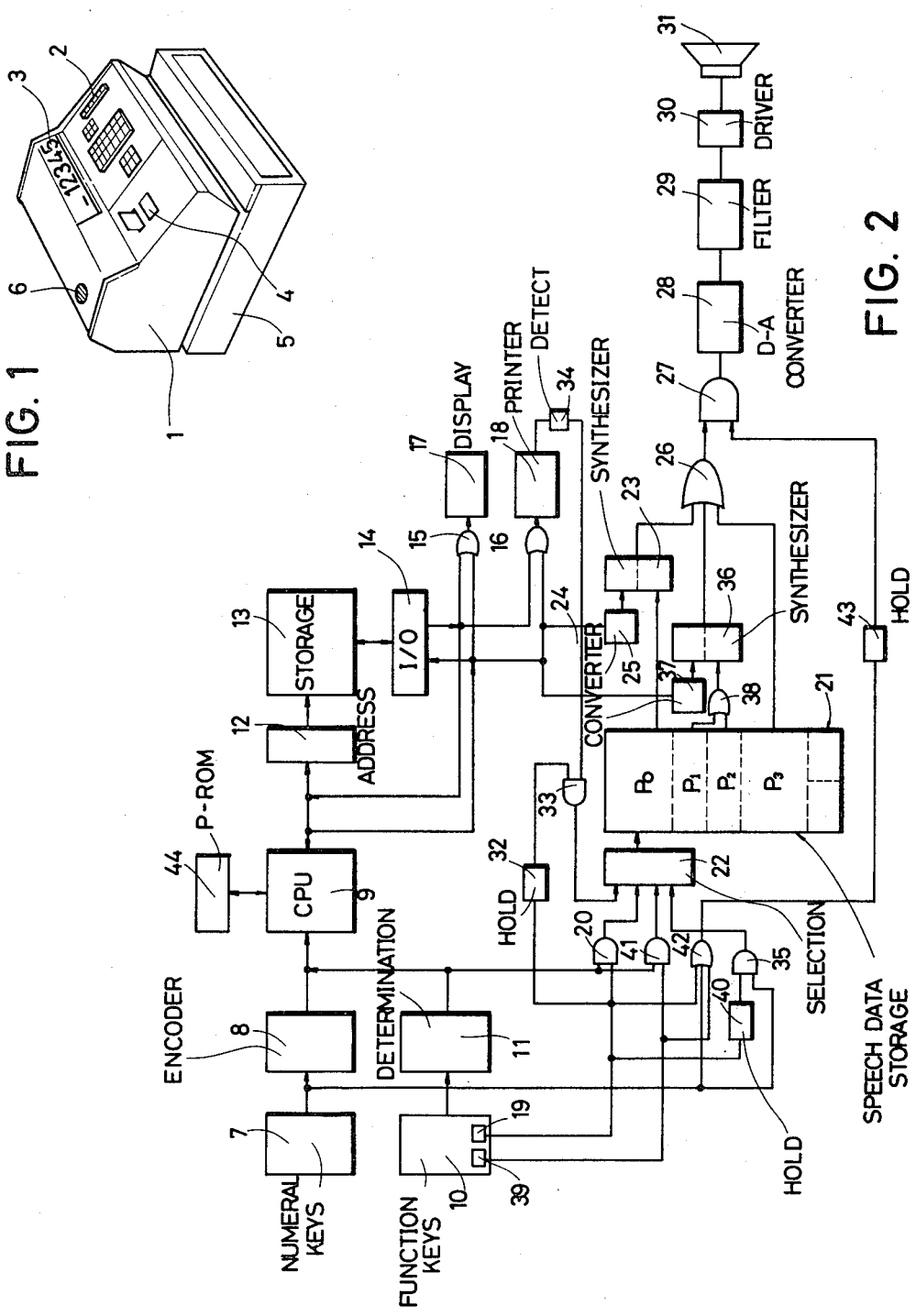

AUDIBLE ANNOUNCEMENT IN AN ELECTRONIC CASH REGISTER

BACKGROUND AND SUMMARY OF THE INVENTION

The present invention relates to an electronic cash register and, more particularly, to an electronic cash register which provides an audible announcement on the transaction data.

The conventional electronic cash register comprises an electronic digital display for displaying the transaction data, and a printer system for printing out the transaction data. There is a possibility that the displayed transaction data is erroneously read. The reliability of the electronic cash register will be greatly enhanced if the transaction data is also announced through a speaker system.

Accordingly, an object of the present invention is to provide an electronic cash register which provides an audible announcement of the transaction information.

Another object of the present invention is to provide a control system for providing a synthetic speech announcement in accordance with the transaction data stored in an electronic cash register.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above object, pursuant to an embodiment of the present invention, a synthetic speech sound generation system is provided in an electronic cash register for providing an audible announcement of the total amount of the transaction when a print completion indication signal is developed from a printer system.

In a preferred form, the electronic cash register also provides an audible announcement of the total money received from the customer, and the change which should be handed to the customer. Moreover, the electronic cash register develops the synthetic speech of a particular message, for example, "Thank you for your patronage." when the transaction is completed.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a perspective view of an embodiment of an electronic cash register of the present invention; and FIG. 2 is a block diagram of a control circuit included in the electronic cash register of FIG. 1.

DESCRIPTION OF THE PREFERRED EMBODIMENTS

FIG. 1 shows an electronic cash register of the present invention.

An electronic cash register 1 mainly comprises a keyboard unit 2 for introducing various transaction information, a digital display unit 3 for displaying the introduced transaction information and a calculation result performed by the electronic cash register 1, and a printer system 4 for printing out a desired data on a journal paper or a receipt slip. The electronic cash register 1 further comprises a drawer 5 for containing the money, and a speaker system 6 for audible announcement purposes.

FIG. 2 shows a control circuit of the electronic cash register of FIG. 1.

The keyboard unit 2 comprises numeral keys 7 and function keys 10. The transaction amount information is introduced from the numeral keys 7 into a central processor unit 9 through a key encoder 8. Then, the function keys 10 are actuated to introduce the information related to the kind of transaction into a key determination circuit 11. In response to actuation of any one of the function keys 10, the amount information temporarily stored in the central processor unit 9 is introduced into and memorized in a predetermined memory section in a storage circuit 13 through an input/output control circuit 14. The memory section is determined in accordance with the actuated function key, and the memory section is selected through an address counter 12.

The thus introduced transaction amount information is applied to a digital display unit 17 through an OR gate 15 for display purposes, and to a printer system 18 through an OR gate 16 for printing out the transaction data on a journal paper or a receipt slip.

When one set of transaction data entry related to one specific customer is completed, a transaction completion instruction key 19, for example, a total key, included in the function keys 10 is actuated. In response to the actuation of the transaction completion instruction key 19, the key determination circuit 11 develops a control signal for effecting the total summing operation within the central processor unit 9, and the total sum is applied to the digital display unit 17 through the OR gate 15 and to the printer system 18 through the OR gate 16. Moreover, the transaction amount information stored in the respective memory sections of the storage circuit 13 is transferred to the corresponding accumulating sections in the storage circuit 13 for accumulating the transaction data by each kind of the transaction.

The electronic cash register of the present invention further comprises a speech data storage unit 21 for storing various kinds of synthetic speech data $P_0$ through $P_n$, and a selection circuit 22 for selecting a desired synthetic speech data stored in the speech data storage unit 21.

When the transaction completion instruction key 19 is actuated, an AND gate 20 is made conductive, whereby a key code signal derived from the key determination circuit 11 is introduced into the selection circuit 22. The selection circuit 22 develops a selection signal for selecting a specific synthetic speech data $P_0$ stored in the speech data storage unit 21. The synthetic speech data $P_0$ is for announcing the total amount of the transaction assigned to a specific customer and, more particularly, is for announcing, for example, "The total amount is . . . ". The thus selected synthetic speech data $P_0$ for anouncing "The total amount is . . . " is transferred to a synthesis circuit 23.

On the other hand, the total sum calculated by the central processor unit 9 is applied to a synthetic speech converter 25 through a signal line 24. A synthetic speech data related to the total sum is developed from the synthetic speech converter 25 and applied to the synthesis circuit 23. Accordingly, an output signal of the synthesis circuit 23 is a synthetic speech data for announcing, for example, "The total amount is ¥5,500.". That is, the synthetic speech converter 25 stores various synthetic speech data for announcing "zero", "one", ..., "nine". The synthetic speech data stored in the synthetic speech converter 25 is selected in accordance with the numeral data derived from the central processor unit 9.

The thus obtained synthetic speech data derived from the synthesis circuit 23 is applied to a digital-to-analog converter 28 via an OR gate 26 and an AND gate 27. An output signal developed from the digital-to-analog converter 28 is applied to a speaker 31 through a low-pass filter 29 and a speaker driver circuit 30 for providing an audible announcement, that is, "The total amount is ¥ 5,500.".

In addition to the above-mentioned operation, when the transaction completion instruction key 19 is actuated, a holding circuit 32 is activated to make conductive an AND gate 33. On the other hand, when the printer system 18 completes the printing out operation of the total sum of the transaction assigned to the specific customer, a detection circuit 34 develops a print completion detection output toward the AND gate 33. An output signal of the AND gate 33 is applied to the selection circuit 22 for selecting a synthetic speech data $P_3$ stored in the speech data storage unit 21. The synthetic speech data $P_3$ is for announcing "Thank you for your patronage.". The thus selected synthetic speech data $P_3$ is applied to the digital-to-analog converter 28 through the OR gate 26 and the AND gate 27. In this way, the speaker 31 develops the synthetic speech announcement of "Thank you for your patronage.". The holding circuit 32 continuously develops an enabling signal until the synthetic speech data $P_3$ is selected.

Now assume that the transaction total sum is ¥ 5,500, and the customer hands a ten-thousand yen bill to the clerk. The clerk introduces the numeral information "10,000" through the numeral keys 7. The thus introduced numeral information is applied to the central processor unit 9 through the key encoder 8, and displayed on the digital display unit 17 and, moreover, printed out onto a receipt slip by the printer system 18.

In response to the actuation of the numeral keys 7, a control signal is applied to the selection circuit 22 through an AND gate 35 for selecting a synthetic speech data $P_1$ stored in the speech data storage unit 21. The synthetic speech data $P_1$ is for announcing "The handed money is . . . ". The thus selected synthetic speech data $P_1$ is applied to a synthesis circuit 36 through an OR gate 38. The numeral information "10,000" temporarily stored in the central processor unit 9 is applied to a synthetic speech converter 37 which develops a synthetic speech data for announcing " ¥10,000" toward the synthesis circuit 36, whereby the synthesis circuit 36 develops a synthetic speech data for announcing "The handed money is ¥ 10,000".

The thus obtained synthetic speech data is applied to the digital-to-analog converter 28 through the OR gate 26 and the AND gate 27. In this way, the speaker 31 develops a synthetic speech announcement of "The handed money is ¥ 10,000.".

One input terminal of the AND gate 35 is connected to receive an output signal derived from a holding circuit 40. The holding circuit 40 is activated by actuation of the transaction completion instruction key 19, and the activated condition is maintained until the announcement related to the handed money is completed.

Thereafter, the clerk actuates a handed money instruction key 39 included in the function keys 10 for indicating that the now introduced numeral information relates to the handed money. The key determination circuit 11 develops a control signal for calculating the change. The central processor unit 9 develops the numeral information related to the change, namely, "4,500" toward the digital display unit 17 and the printer system 18.

In response to actuation of the handed money instruction key 39, an AND gate 41 is made conductive to introduce the key code signal into the selection circuit 22. The selection circuit 22 selects a synthetic speech data $P_2$ stored in the speech data storage unit 21. The synthetic speech data $P_2$ is for announcing the information "The change is . . . ". The thus selected synthetic speech data $P_2$ is applied to the synthesis circuit 36 through the OR gate 38. Moreover, the numeral information "4,500" calculated by the central processor unit 9 is introduced into the synthetic speech converter 37. The synthetic speech converter 37 develops a synthetic speech data for announcing " ¥4,500" toward the synthetic circuit 36. Accordingly, the speaker 31 develops a synthetic speech announcement of "The change is ¥4,500.".

While the above-mentioned synthetic speech operation is performed, a holding circuit 43 is activated through an OR gate 42. Accordingly, the AND gate 27 is made conductive until the respective audible announcement is completed. An operation flow of the electronic cash register is programmed in a P-ROM 44 for controlling the operation of the central processor unit 9.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic cash register for use in conjunction with a sales transaction, said sales transaction including the computation of a total, the tendering of money, and the rendering of change in response thereto, comprising:

numeral keys for introducing information relating to the computation of said total and the tendering of said money;

function keys for conducting said sales transaction, said function keys including a transaction completion instruction key and a handed money instruction key;

central processor unit means connected to said numeral keys and said function keys and responsive to actuation thereof for performing a calculation operation on said information thereby producing said total and for storing said total therein, said processor unit means storing the amount of the tendered money therein in response to the information entered via said numeral keys, said processor unit means calculating the amount of said change in accordance with the tendered money and the total;

a printer system connected to said central processor unit means for printing out the information introduced via said numeral keys and said total produced by said central processor unit means;

a detection circuit connected to an output terminal of said printer system for developing a detection output when printing in conjunction with a transaction is complete;

synthetic speech data storage means for storing synthetic speech data therein related to said sales transaction;

selection and synthesis means connected to said central processor unit means and to said synthetic speech data storage means and responsive to actuation of said transaction completion instruction key, said handed money instruction key and said detection output for selecting desired ones of said synthetic speech data stored in said synthetic speech data storage means and for synthesizing the selected synthetic speech data with the total, the amount of the money tendered, and the amount of said change stored in said central processor unit means thereby producing synthesized synthetic speech;

said selection and synthesis means selecting synthetic speech data relating to the computation of said total and the tendering of said money in response to actuation of said transaction completion instruction key and synthesizing said synthetic speech data with said total and the amount of the money tendered;

said selection and synthesis means selecting synthetic speech data relating to the rendering of said change in response to actuation of said handed money instruction key and synthesizing the selected synthetic speech data with the amount of said change; and audio system means connected to said synthetic speech data storage means and responsive to the synthesized synthetic speech data produced by said selection and synthesis means for providing an audible announcement representative of said total, the money tendered, and the change rendered in response thereto.

2. An electronic cash register in accordance with claim 1, wherein said synthesis means comprises:

selection circuit means connected to said numeral keys and to said processor unit means and responsive to actuation of said transaction completion instruction key and said handed money instruction key for selecting said desired ones of said synthetic speech data stored in said synthetic speech data storage means and for developing an output signal representative thereof;

converter circuit means connected to said central processor unit means for receiving said total, said amount of the tendered money, and said amount of said change therein from said processor unit means and developing an output signal indicative thereof; and synthesizer circuit means responsive to the output signals from said selection circuit means and from said converter circuit means for synthesizing the selected desired synthetic speech data from said selction circuit means with said total, said amount of the tendered money, and said amount of said change thereby producing said synthesized synthetic speech data.

3. An electronic cash register in accordance with claim 2, further comprising:

display means connected to said central processor unit means for providing a display of said total, said amount of the tendered money, and said amount of said change;

said printer system further providing a printed copy of said amount of the tendered money and said amount of said change.

4. The electronic cash register of claim 1, wherein said synthetic speech data comprises data for announcing "Thank you for your patronage.".

5. The electronic cash register of claim 1, further comprising:

synthetic speech data forming means connected to said central processor unit means for developing further synthetic speech data in accordance with the total stored in said central processor unit means; and synthesis means connected between said synthetic speech data forming means and said audio system means and responsive to the further synthetic speech data from said synthetic speech data forming means and to the synthetic speech data selected by said selection and synthesis means for combining said further synthetic speech data developed from said synthetic speech data forming means with said synthetic speech data selected by said selection means, said audio system means producing said audible announcement in response thereto.

* * * * *